United States Patent [19]

Harris et al.

[11] 4,052,348

[45] Oct. 4, 1977

[54] MOLDING COMPOSITIONS

[75] Inventors: Alva F. Harris; Peter Shapras, both of Wilbraham, Mass.

[73] Assignee: Monsanto Company, St. Louis, Mo.

[21] Appl. No.: 323,772

[22] Filed: Jan. 15, 1973

[51] Int. Cl.$^2$ .................... C08L 7/00; C08L 25/12
[52] U.S. Cl. ................................... 260/5; 260/851; 260/898; 426/106; 526/1; 526/14; 526/16; 526/23; 526/55
[58] Field of Search .............. 260/73 R, 85.5 S, 851, 260/5, 898; 526/23, 55

[56] References Cited

U.S. PATENT DOCUMENTS

| 2,768,995 | 10/1956 | Mosse | 260/73 R |
|---|---|---|---|
| 2,946,760 | 7/1960 | DeWitt et al. | 260/73 R |
| 3,597,496 | 8/1971 | Dagon et al. | 260/851 |

FOREIGN PATENT DOCUMENTS

| 994,033 | 6/1965 | United Kingdom | 260/85.5 |

*Primary Examiner*—Wilbert J. Briggs, Sr.
*Attorney, Agent, or Firm*—Michael J. Murphy; William J. Farrington

[57] ABSTRACT

Improved molding compositions especially adapted for fabrication into packaging materials, which compositions comprise an intimate blend of a nitrile polymer and a formaldehyde compound.

5 Claims, No Drawings

MOLDING COMPOSITIONS

BACKGROUND OF THE INVENTION

1. Field of the Invention

The present invention relates to improved molding compositions. More particularly, the present invention relates to improved molding compositions comprising an intimate blend of a high nitrile polymer and a formaldehyde compound. These molding compositions are especially adapted for fabrication into molded packaging material which have a very low level of extractable HCN.

2. Description of the Prior Art

In recent years it has been discovered that certain polymeric nitrile resins are especially suitable for packaging applications because of their excellent water and oxygen barrier properties. Such polymers are described at length in U.S. Pat. Nos. 3,451,528, 3,615,710, 3,426,102 and British Pat. No. 1,186,361, among others. Even more recently it has been discovered that although such nitrile polymers have excellent barrier properties they may be unsuitable for certain packaging applications because they contain trace, though detectable, amounts of hydrogen cyanide (HCN) which may be extracted by and impart a taste to the contents of the package. The amount of HCN in such nitrile polymers will vary with the nitrile monomer, the total nitrile content of the polymer, the polymerization method used to prepare the polymer, the processing and thermal history of the polymer and other factors. Moreover, it has been found that the amount of extractable HCN in nitrile polymers may be increased after the polymer has been subjected to forming operations wherein the polymer has been heated in order to soften and/or melt the polymer prior to forming it into shaped articles.

The trace amount of extractable HCN present in such nitrile packaging materials is very low and presents no known health or safety problems. In fact, the amount of extractable HCN in such nitrile polymers is lower than that found in many foods. In this regard it should be noted that HCN is a natural component in many foods and many other foods such as cereals, cocoa, ham, bacon and sausage, which are fumigated with HCN (prussic acid), are permitted to contain from 50 to 200 parts per million of HCN. (See the Food Additive Regulations of the FDA (Page 31, Subpart D, Paragraph 121,1072) as published in the Feveral Register: Dec. 23, 1965; 30 F.R. .15912 and the 1962 Public Health Service Publication 956 "Drinking Water Standards").

However, as stated above, the HCN in certain nitrile packaging materials may, in certain instances, be extracted and impart a taste to the contents of the package. The problem of HCN extraction as it affects taste, is of concern in the packaging of beverages which are in prolonged intimate contact with the container. In these packaging applications the probability of HCN extraction is very high.

Thus, there exists in the art a need for improved nitrile polymer molding compositions which can be fabricated into packaging materials which are substantially free of extractable HCN. This need is fulfilled by the present invention which provides a molding composition adapted for the fabrication of packaging materials with a very low extractable HCN content. More particularly, molding compositions of the present invention are especially suitable for the preparation of packaging materials such as bottles, cans, jars, etc., which are used in the packaging of beverages, including carbonated beverages, where the probability of HCN extraction is very high.

SUMMARY OF THE PRESENT INVENTION

The present invention fulfills the aforementioned need by providing nitrile polymer molding compositions which are adapted for fabrication into packaging materials which contain very low amounts of extractable HCN. Food or related substances such as beverages, packaged in materials prepared from the molding compositions of the present invention extract less than 50 parts per billion (<50 PPB) and preferably less than 20 PPB (<20 PPB) of HCN.

The present invention comprises an improved molding composition especially adapted for use in the preparation of shaped packaging materials which composition comprises an intimate blend of a nitrile polymer containing from 55 to 85% by weight of nitrile monomer units (calculated as acrylonitrile) based on the total polymer weight, and a formaldehyde compound containing from 0.0005 to 2% by weight of available formaldehyde based on the weight of the nitrile polymer.

PREFERRED EMBODIMENTS

It is preferred in the practice of the processes of this invention to employ nitrile polymers, as defined herein, having an extractable HCN content in excess of 50 PPB and more preferably, in excess of 20 PPB. The extractable HCN content, as referred to in the preceding sentences, is the HCN extracted from the polymer after heating and shaping the polymer per se, e.g., in the absence of a formaldehyde compound, using an extraction period of 3 days and 49° C. in accordance with the test procedures hereinafter described.

The high nitrile polymers used in the improved molding compositions of the present invention contain from 55% to 85% by weight of a nitrile monomer unit, based on the total polymer weight, wherein the weight percent of nitrile monomer is calculated as acrylonitrile. The nitrile monomers include acrylonitrile, methacrylonitrile, ethacrylonitrile, propacrylonitrile, glutaronitrile, methyleneglutaronitrile, fumaronitrile, etc., as well as mixtures of these monomers. The preferred monomers which are interpolymerized with the nitrile monomers include aromatic monomers such as styrene and alpha methylstyrene; lower alpha olefins containing 2 to 6 carbon atoms such as ethylene, propylene, butylene, isobutylene, etc.; acrylic acid and methacrylic acid and the corresponding acrylate and methacrylate esters containing 1 to 4 carbon atoms such as methyl acrylate, ethyl acrylate, propyl acrylate, butyl acrylate and the corresponding methacrylates; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing.

Optionally, the high nitrile packaging materials may contain from 0-25% by weight of a synthetic or natural rubber component such as polybutadiene, isoprene, neoprene, nitrile rubbers, acrylate rubbers, natural rubbers, acrylonitrile-butadiene copolymers, ethylene-propylene copolymers, chlorinated rubbers, etc., which is used to strengthen or toughen the high nitrile packaging materials. This rubbery component may be incorporated into the polymeric packaging material by any of the methods which are well known to those skilled in the art, e.g., direct polymerization of monomers, grafting the nitrile monomer onto the rubbery backbone, polyblend of a rubber graft polymer with a matrix polymer, etc.

The preferred nitrile polymers for those packaging applications requiring excellent oxygen and water vapor barrier properties in the packaging materials, are those nitrile polymers containing from 55 to 85% by weight, based on the total polymer weight, of an acrylonitrile and/or methacrylonitrile monomer (wherein the weight percent of methacrylonitrile is calculated as acrylonitrile). When acrylonitrile is used as the sole nitrile monomer the preferred range is from 60 to 83% by weight whereas the methacrylonitrile the preferred range is from 70 to 98% by weight of methacrylonitrile which corresponds to about 55 to 78% by weight of nitrile monomer calculated as acrylonitrile. The preferred comonomers are styrene and alpha methyl styrene. Also preferred are interpolymers such as acrylonitrile/methacrylonitrile/ styrene; acrylonitrile/styrene/-methyl vinyl ether and acrylonitrile/styrene/ ethyl vinyl ether.

The formaldehyde compound used in the molding compositions of the present invention includes free or unreacted formaldehyde, homopolymers of formaldehyde, or other compounds which yield formaldehyde upon heating or processing or else behave as formaldehyde or formaldehyde donors in the presence of the nitrile polymer.

Examples of homopolymers of formaldehyde suitable for use in the present invention include the cyclic polymers such as trioxane and tetraoxane as well as the linear polymers of formaldehyde which comprise the polyoxymethylene glycols and their derivatives. These polymers have the general formula HO $(CH_2O)_n$ H where $n$ is an integer of at least 2. The upper limit for $n$ may be as high as 5000 for certain derivatives of the polyoxymethylene glycols. These polymers are described at length in Walker, J. Frederic, FORMALDEHYDE, 3rd Edition, 2nd Printing, Reinhold Publishing Corp., New York (1967).

Preferred linear homopolymers are those where $n$ has a value in the range of from 8 to 300. Especially preferred homopolymers are those where $n$ has a value in the range of from 8 to 100. These latter polymers are sold commercially as paraformaldehyde. The commercially available paraformaldehyde usually contains 90 to 99% formaldehyde with a minimum of 95% formaldehyde by weight being preferred.

Formaldehyde compounds which yield formaldehyde include alkali metal formaldehyde bisulfites, alkali metal formaldehyde sulfoxylates, etc. such as sodium formaldehyde bisulfite, potassium formaldehyde busilfite, sodium formaldehyde sulfoxylate, potassium formaldehyde sulfoxylate, etc.

Other compounds considered here as formaldehyde compounds, which yield formaldehyde upon heating or processing or else behave as formaldehyde or formaldehyde donors include hexamethylenetetramine, 2-nitro-2-methyl-1,3-propanediol, tris(hydroxymethyl)nitromethane as well as addition products of formaldehyde and at least one other compound and condensates prepared therefrom. Examples of these addition products and condensates include phenol-formaldehyde; urea-formaldehyde condensates including dimethylol urea and the cyclic derivatives thereof such as ethylene urea-formaldehyde condensates and the uron resins; formaldehyde adducts of saccharides such as those described in U.S. Pat. No. 3,705,146; triazine compounds such as melamine-formaldehyde, benzoguanamine-formaldehyde, etc; amide-formaldehyde condensates, e.g., such as paratoluene sulfonamide-formaldehyde, methylolacetamide, methylolformamide and methylolacrylamide.

Other suitable formaldehyde compounds which yield formaldehyde or behave as formaldehyde or formaldehyde donors are well known to those skilled in the art and will become apparent upon reading the above.

The preferred formaldehyde compounds are formaldehyde, paraformaldehyde, trioxane, tetraoxane, dimethylolurea and para-toluene sulfonamideformaldehyde condensates.

The amount of formaldehyde compound in the molding compositions should be sufficient to reduce the extractable HCN content of the resulting nitrile packaging material below 50 PPB, preferable below 20 PPB, but insufficient to impart a formaldehyde taste or odor to the food or beverage packaged therein. In general, the amount of formaldehyde required to achieve this reduction in extractable HCN content will be in the range of from 0.005 to 2.0% by weight based on the weight of the nitrile polymer. In most applications, the amount of formaldehyde will be in the range of from 0.01 to 1.0% by weight. When using a formaldehyde compound which yields formaldehyde or else behaves as formaldehyde or a formaldehyde donor, the amount of such formaldehyde compound is calculated so as to provide an amount of formaldehyde within the above ranges.

As stated above, the improved molding compositions of the present invention comprises an intimate blend of the nitrile polymer and the formaldehyde compound. The intimate blend of formaldehyde compound and nitrile polymer may be obtained by adding the formaldehyde compound to the polymerization reactor used to prepare the nitrile polymer. Alternately, the formaldehyde compound can be combined with the nitrile polymer after the polymerization step, as for example by adding it to the nitrile polymer in the polymer recovery steps such as during coagulation, stripping, washing, drying, etc., or by steeping the polymer in a liquid containing the formaldehyde compound. Another method is to dry blend the nitrile polymer and the formaldehyde compound prior to the forming step used to shape the polymer. In still another method, the formaldehyde compound and the nitrile polymer are dispersed in a liquid medium followed by evaporation of the liquid medium. In still another method, the formaldehyde compound, preferably free formaldehyde, is injected into the molten polymer during the forming operation. Other methods of forming the intimate blend will become apparent to those skilled in the art upon reading the instant specification.

When employing the formaldehyde compound during the polymerization process for preparing the nitrile polymer, care must be taken to select compounds and conditions which will not interfere with the polymerization reaction or cause adverse properties in the nitrile resin product. Moreover, the formaldehyde compound used in the polymerization step should not be removed or rendered ineffective during the polymerization and polymer recovery steps. It should be available to release formaldehyde during the forming operation to reduce the level of extractable HCN in the resulting packaging material.

In general, the preferred methods of forming the intimate blends are blending the nitrile polymer in dry form with the formaldehyde compound or steeping the polymer in a liquid, preferably a non-solvent for the polymer, containing the formaldehyde compound.

The forming operations used to prepare polymeric packaging materials, e.g., films, sheets, containers, such as bottles, cans, jars, etc. in accordance with this invention are carried out by shaping the nitrile polymers in an essentially solvent-free condition by procedures well known in the art and which do not require further explanation here. These forming operations include both the heating step, wherein the nitrile polymer is heated to the molten state by subjecting it to temperatures in the range of from 93° to 274° C. in order to soften or melt or otherwise enable shaping of the polymer, and any subsequent shaping steps performed on such molten nitrile polymer. The heating and shaping steps may occur sequentially or simultaneously. Examples of forming operations used to prepare polymeric packaging materials include pelletizing, extrusion, blow molding, injection molding, parison forming, orientation, vacuum forming, thermoforming, etc.

In certain instances the preparation of packaging materials may involve more than one forming operation wherein the nitrile polymer is heated and shaped. This occurs, for example, in the case of a polymer which is heated to a molten state, extruded and pelletized and then the pellets are heated to a molten state and shaped into a parison which is then shaped into a bottle or some other form of container. In such situations the present invention contemplates forming the intimate blend of nitrile polymer and formaldehyde compound before the last of the forming operations wherein the polymer is heated to a molten state, i.e., to the point where it softens or melts, and then shaped.

Preferably, when more than one heating step is involved the formaldehyde compound is brought into intimate contact with the nitrile polymer before or during the first step wherein the polymer is heated to a molten state.

The actual measurement of the amount of HCN extracted by the extracting liquid is not considered to be a part of this invention. In this regard, any method capable of detecting amounts of HCN as low as 20 PPB can be used to measure the amount of extracted HCN. These methods, which are well known to those skilled in the art, include colorimetric measurements, polargraphic measurements, gas chromatographic measurements and electrochemical measurements.

Tests to determine the amount of extractable HCN in packaging material prepared from nitrile polymersd are run on 10 ounce beverage bottles. The extraction tests are run for 3 days at 49° C. and for 7 7 days at 38° C. Experience has shown that the amount of HCN that is extracted from a test sample will level off with time as will be illustrated further below. Consequently, extraction times longer than three to seven days are not necessary. In many instances it is more convenient to run HCN extraction tests on molded test samples such as tensile bars or other convenient shapes rather than on bottles or other packaging material. As is illustrated below, there is a good correlation between extraction tests run on molded tensile bars and extraction tests run on the 10 ounce molded bottles. The ratio of the surface area of the tensile bars (about 10 square inches) to the volume of extracting liquid used (70 cc) in the examples set forth below approximates the ratio of the surface area of the inside of a 10 ounce beverage bottle (about 40 square inches) which is in contact with the extracting liquid (10 ounces or 297 cc). The ratio of surface area to volume of extracting liquid (square inches/cc) is about 0.135 for the 10 ounce bottles and about 0.143 for the tensile bars used in the examples below. In general, a ratio of surface area/volume of extracting liquid in the range of 0.13/1 to 0.15/1 is adequate for determining extractable HCN for most packaging applications.

The tests described below, using a 3% acetic acid solution (an FDA food simulant for acid type foods) as the extracting liquid, illustrates one of the more difficult packaging applications where there is a high probability of extracting HCN. In other less difficult applications, such as the packaging of dry rice, oranges, bananas, aspirin, etc., such rigorous tests for determination of extractable HCN may not be necessary. At any rate, those skilled in the art, upon reading the present specification, can readily select test samples and test conditions to suit their particular needs.

The following examples are set forth in illustration of the present invention and should not be construed as limitations thereof. All parts and percentages of resin and formaldehyde compound are by weight unless otherwise specified. Wherever convenient, acrylonitrile is abbreviated as AN and methacrylonitrile as MAN and unless otherwise specified 3% acetic acid solution is used as the extracting liquid. The amount of formaldehyde compound used is expressed by weight based on the weight of the nitrile polymer. The PPB values for extracted HCN refers to nanograms of HCN per gram of extracting liquid.

EXAMPLES 1 to 4

Ten ounce beverage bottles are prepared by blending a copolymer containing 70% by weight acrylonitrile and 30% by weight styrene prepared by conventional aqueous polymerization methods with various amounts of paraformaldehyde. The paraformaldehyde used is a commercially available material corresponding to the formula set forth above in the specification, wherein in is an integer of from 8 to 100. The blends are extruded into pellets using extrusion temperatures in the range of from 216° to 232° C. The pellets are then shaped into parisons at temperatures in the range of from 216° to 232° C. and formed into the final bottles.

The test bottles are rinsed with water, filled with ten ounces (297 cc) of the various extracting solutions (water, ethanol and acetic acid) capped and heated for three days at 49° C. (120° F.). The bottles and contents are then cooled to room temperature and the amount of HCN in PPB extracted by the extracting liquid is determined.

The results of these tests, which are run in triplicate, are tabulated in Table 1 below.

TABLE I

| | SUMMARY OF EXAMPLES 1 to 4 | | | |
|---|---|---|---|---|
| | Amount of | PPB OF HCN EXTRACTED | | | |
| Ex. | Paraform-aldehyde[(1)] | Distilled Water | 8% Ethanol | 25% Ethanol | 3% Acetic Acid |
| 1 | none | 60–70 | 70–80 | 80 | 100 |
| 2 | 0.01 | 20–30 | <20 | <20 | <20 |
| 3 | 0.02 | <20 | <20 | <20 | <20 |
| 4 | 0.03 | <20 | <20 | <20 | <20 |

[(1)]Percent by weight based on the weight of the nitrile resin.

Control Example 1 illustrates that when no formaldehyde compound is added to the nitrile polymer the amount of HCN extracted is in the range of 60 to 100 PPB with 3% acetic acid being the most powerful extracting liquid. Examples 2 to 4 illustrate that the use of small amounts of paraformaldehyde causes a significant reduction in the amount of extractable HCN.

EXAMPLE 5

An acrylonitrile/styrene copolymer (70% AN) of the type used to prepare the bottles in Examples 1 to 4 above is used to prepare dog-bone type molded tensile bars having a surface area of about 10 square inches according to ASTM D-638-68 (Type 1) by molding the nitrile polymer at 218° C. and 1400 psi.

The molded tensile are rinsed clean with methanol, wiped dry and placed in a test tube (25 × 300 mm). Seventy (70) cubic centimeters (cc) of a 3% acetic acid solution (30 grams of glacial acetic acid solution in 970 grams distilled water) are charged to the test tube containing the tensile bar. The test tube is then sealed with a rubber seal lined with Reynolds Reynolon and the tube is placed in a 49° C. oven for 3 days. The test tube is then cooled to room temperature and the amount of HCN extracted into the solution is determined. The test results are summarized below.

|  | Samples | | | | |
| --- | --- | --- | --- | --- | --- |
|  | A | B | C | D | E |
| % Paraformaldehyde[1] | none | 0.03 | 0.07 | 0.10 | 0.30 |
| Color[2] | 54 | 81 | 70 | 63 | 73 |
| Extracted HCN (PPB) | 98 | <20 | <20 | <20 | <20 |

[1] By weight based on the weight of the nitrile resin.
[2] Color is Three Point Yellowness (3 PY) measured on a tensile bar at 420, 500 and 700 millimicrons using transmitted light.

A review of the above data further illustrates the efficiency of paraformaldehyde in reducing the amount of extractable HCN in the tensile bar test samples. The test also illustrates the good correlation between test methods using bottles and tensile bars.

The color values indicate that the formaldehyde compound introduces some color formation in the molded samples. However, for most packaging applications this color formation is within acceptable limits and does not detract from the utility of the packaging material.

The following Examples 6 to 11 illustrate the effect of thermal history on the HCN content of a series of nitrile polymers prepared using conventional suspension polymerization methods wherein the addition of styrene is delayed into the reaction vessel. The polymers tested do not contain any formaldehyde compound. The polymer used in Examples 6 to 10 is a copolymer of acrylonitrile and styrene while in Example 11 the polymer is a terpolymer of acrylonitrile/methacrylonitrile/styrene (60/15/25% by weight). The polymer beads are extruded into pellets using an extrusion set temperature of 204° C. and the pellets are molded into tensile bars at 218° C. and 1400 psi as outlined above. In each example the total HCN content in the beads, pellets and tensile bars is measured by dissolving 0.1 gram of polymer in 10 ml of dimethyl sulfoxide and then determining the amount of HCN present. The results of these tests are reported below in Table 11. HCN values are in parts per million.

TABLE II

SUMMARY OF EXAMPLES 6 to 11

|  |  |  | AMOUNT OF HCN (PPM) | | |
| --- | --- | --- | --- | --- | --- |
| Ex. | % AN | Polymerization Temperature | Beads | Pellets | Tensile Bars |
| 6 | 67 | 130–145° C. | 5.2 | 9.3 | 16 |
| 7 | 72 | 130–145° C. | 5 | 7 | 21 |
| 8 | 70 | 130–145° C. | 8.8 | 12 | 27 |
| 9 | 71 | 75–90° C. | 4.8 | 9.2 | 21 |
| 10 | 70 | 75–90° C. | 9.7 | 10 | 25 |
| 11 | 60 | 130–145° C. | 5.7 | 11 | 21 |

The data in the foregoing Table 11 indicate that the total amount of HCN in the particular polymers tested increases with the thermal processing of the polymer. The amount of HCN generated in nitrile polymers will depend on several factors including the thermal stability of the polymer and the processing temperatures.

The following data illustrate the time-temperature HCN extraction relationship and that the amount of extractable HCN levels off with time. The extraction tests are conducted on tensile bars which are prepared using the procedures outlined above. The test is run on a nitrile polymer which contains 72% by weight acrylonitrile and 28% by weight styrene. The test samples are control samples which do not contain any formaldehyde compounds. The results of these tests are tabulated in Table 111 below.

TABLE III

TIME-TEMPERATURE-EXTRACTED HCN RELATIONSHIP

| Time (Hours) | Temperature (° C.) | Extracted HCN (PPB) |
| --- | --- | --- |
| 180 | 21 | 56 |
| 670 | 21 | 82 |
| 880 | 21 | 84 |
| 90 | 38 | 72 |
| 160 | 38 | 88 |
| 670 | 38 | 124 |
| 15 | 49 | 52 |
| 40 | 49 | 84 |
| 90 | 49 | 112 |
| 160 | 49 | 140 |
| 210 | 49 | 144 |
| 15 | 66 | 100 |
| 40 | 66 | 140 |
| 65 | 66 | 150 |
| 90 | 66 | 190 |
| 160 | 66 | 224 |
| 210 | 66 | 232 |

Referring to the foregoing data it is apparent that at any given temperature, the amount of extractable HCN levels off with time. Stated another way, the amount of HCN extracted from a test sample does not increase significantly after a certain time period. The foregoing data also shows that more HCN is extracted at elevated temperatures.

The following Examples 12 to 24 are set forth to illustrate some of the variations in nitrile resins which may be used in the practice of the present invention. The resins in dry particle form, dry blended with paraformaldehyde, are extruded into pellets using extrusion temperatures of about 204° C. The pellets are then molded into tensile bars and tested for extractable HCN using an extraction time of one day at 38° C. for Examples 12 to 22 and three days at 49° C. for Examples 23 and 24.

The polymers used in Examples 12 to 16 and 20 to 22 are rubber modified polymers which are polyblends of a rigid matrix and rubber modified polymer.

The polymer used in Examples 12 to 14 is a polyblend of about 85 parts of poly(acrylonitrile/methylacrylate) (75/25% by weight) and about 15 parts of a compatible rubber impact modifier.

The polymer used in Examples 15 and 16 is a polyblend of about 75 parts of poly(acrylonitrile/styrene) (70/30% by weight) and about 25 parts of a compatible rubber impact modifier prepared by grafting AN/styrene (62/38% by weight) onto butadiene/AN (93/7% by weight) rubber.

The polymers used in Examples 17 to 19 and 23 to 24 contain no impact modifier. The polymer used in Examples 17 to 19 is poly(acrylonitrile/methacrylonitrile/styrene) (59/16/25% by weight) and that in Examples 23 and 24 is poly(acrylonitrile/styrene) (64/36% by weight).

The test results are tabulated in Table IV below wherein the expression "resin composition" when used in reference to the rubber modified samples (Examples 12 to 16 and 20 to 22) refers to the composition of the rigid matrix.

TABLE IV
SUMMARY OF EXAMPLES 12 to 24

| Example | Composition | Resin Composition % By Weight | % Paraformaldehyde[1] | Extracted HCN (PPB) | Extraction Period Days/° C. |
|---|---|---|---|---|---|
| 12 | AN/methylacrylate | 75/25 | None | 27 | 1/38 |
| 13 | " | 75/25 | 0.1 | <20 | 1/38 |
| 14 | " | 75/25 | 0.5 | <20 | 1/38 |
| 15 | AN/styrene | 70/30 | None | 40 | 1/38 |
| 16 | " | 70/30 | 0.1 | <20 | 1/38 |
| 17 | AN/MAN/styrene | 59/16/25 | None | 31 | 1/38 |
| 18 | " | 59/16/25 | 0.1 | <20 | 1/38 |
| 19 | " | 59/16/25 | 0.5 | <20 | 1/38 |
| 20 | " | 59/16/25 | None | 36 | 1/38 |
| 21 | " | 59/16/25 | 0.1 | <20 | 1/38 |
| 22 | " | 59/16/25 | 0.5 | <20 | 1/38 |
| 23 | AN/styrene | 64/36 | None | 50 | 3/49 |
| 24 | " | 64/36 | 0.1 | <20 | 3/49 |

[1]Percent by weight based on the weight of the nitrile polymer.

The data in Table IV show that the present invention is applicable to a wide variety of nitrile resins including rubber modified resins and terpolymers.

The following Examples 25 to 33 illustrate the use of cyclic homopolymers of formaldehyde in the practice of the present invention. The nitrile resin used is an acrylonitrile/styrene copolymer which contains 70% by weight acrylonitrile and 30% styrene. The nitrile resin particles and the formaldehyde polymer are blended, extruded into pellets and formed into tensile bars and tested for extractable HCN. Examples 25 to 27 use a three day at 49° C. extraction period while Examples 28 to 33 use a one day at 38° C. extraction period. The results of these tests are tabulated in Table V below.

TABLE V
SUMMARY OF EXAMPLES 25 to 33

| Ex. | Formaldehyde Compound | % By weight[1] | Extracted HCN (PPB) | Extraction Period Days/° C. |
|---|---|---|---|---|
| 25 | Control | None | 98 | 3/49 |
| 26 | Trioxane | 0.1 | 50 | 3/49 |
| 27 | " | 1.0 | <20 | 3/49 |
| 28 | Control | None | 25 | 1/38 |
| 29 | Tetraoxane | 0.1 | <20 | 1/38 |
| 30 | " | 0.3 | <20 | 1/38 |
| 31 | Tetraoxane & 0.1% citric acid | 0.03 | <20 | 1/38 |
| 32 | Tetraoxane & 0.1% citric acid | 0.1 | <20 | 1/38 |
| 33 | Tetraoxane & 0.1% citric acid | 0.3 | <20 | 1/38 |

[1]Based on the weight of the nitrile resin.

The data in the above Table V show the significant reduction in extractable HCN content that is obtained when using trioxane and tetraoxane.

EXAMPLES 34 to 39

Examples 34 to 39 illustrate the use of formaldehyde condensates in the practice of the present invention. The nitrile polymer is a copolymer of acrylonitrile/sytrene containing 70% acrylonitrile. The nitrile polymer and the formaldehyde compound are blended, extruded into pellets and formed into tensile bars. The HCN extraction data is obtained using the one day at 38° C. test. The test results are tabulated in Table VI below.

TABLE VI
SUMMARY OF EXAMPLES 34 to 39

| Ex. | Formladehyde Copound | % By Weight | Extracted HCN (PPB) |
|---|---|---|---|
| 34 | Control | None | 43 |
| 35 | para-toluene sulfonamide-formaldehyde[1] | 2 | <20 |
| 36 | melamine-formaldehyde-n-butanol[2] | 3 | <20 |
| 37 | urea-formaldehyde-methanol[3] | 3 | <20 |
| 38 | phenol-formaldehyde-t-butanol | 3 | <20 |
| 39 | dimethylol urea | 0.1 | <20 |

[1]Commercially available from Monsanto Company as Santolite MHP - a condensate of para-toluene sulfonamide and formaldehyde (1.1 to 1.0 mole ratio) having a molecular weight of about 600.
[2]Commercially available from Monsanto Company as Resimene 750 - a condensate of melamine, formaldehyde and butanol in butanol (66% solids).
[3]Commercially available from Monsanto Company as Resimene 980 - a condensate of urea/formaldehyde/methanol in liquid form.

The above results show the significant lowering of the amount of extractable HCN that is obtained when using formaldehyde condensates or addition products as the formaldehyde component.

EXAMPLES 40 to 43

In these examples the formaldehyde compound is blended with an acrylonitrile/methacrylonitrile/styrene (59/16/25) terpolymer, extruded to form pellets and molded into tensile bars and tested for extraction HCN using an extraction time of three days at 49° C. The results are tabulated in Table VII below.

TABLE VII
SUMMARY OF EXAMPLES 40 to 43

| Ex. | Formaldehyde Compound | % By Weight | Extracted HCN (PPB) |
|---|---|---|---|
| 40 | Control | None | 127 |
| 41 | Sodium formaldehyde sulfoxylate | 0.2 | <20 |
| 42 | Sodium formaldehyde bisulfite | 0.2 | <20 |
| 43 | Sodium formaldehyde bisulfite | 0.05 | 25 |

The above results show the significant lowering of the amount of extractable HCN that is obtained when using sodium formaldehyde sulfoxylate or sodium formaldehyde bisulfite as the formaldehyde compound. It should be noted further that the formaldehyde equivalent of the sodium formaldehyde sulfoxylate used in Example 41 is about 0.05% by weight based on the weight of the polymer. The formaldehyde equivalent of the sodium formaldehyde bisulfite used in Example 42 and 43 is about 0.04% and 0.01% by weight, respectively, based on the weight of the polymer.

EXAMPLES 44 to 47

These examples illustrate the use of hexamethylenetetramine (HMTA) as the formaldehyde compound. HMTA, which for the purposes of the present invention is considered to be a formaldehyde compound, is widely recognized as a source of formaldehyde as is evidenced by the discussion in FORMALDEHYDE by Frederic J. Walker at page 511. The nitrile resin used is an acrylonitrile/styrene (70/30% weight) copolymer in bead form. One test series is run using beads with a moisture content of 0.69% (moist beads) while the other is run using beads with a moisture content of 0.07% (dry beads). The nitrile resin and the formaldehyde compound are blended, extruded into pellets and formed into tensile bars and tested for extractable HCN. The test results for these examples are tabulated in Table VIII below.

TABLE VIII

SUMMARY OF EXAMPLES 44 to 47

| | | Extraction Tests - HCN (PPB) | | | |
|---|---|---|---|---|---|
| | Percent | One Day at 38° C. | | Three Days at 49° C. | |
| Ex. | HMTA | Moist Beads | Dry Beads | Moist Beads | Dry Beads |
| 44 | Control | 70 | 70 | 141 | 141 |
| 45 | 0.1 | <20 | <20 | <20 | <20 |
| 46 | 0.5 | <20 | <20 | <20 | 21 |
| 47 | 1.0 | <20 | <20 | <20 | 36 |

The above data show that HMTA significantly lowers the extractable HCN content of both moist and dry beads. Moreover, the data indicates that a smaller amount of HMTA (0.1% used in Example 45) is more effective than the larger amounts used in Examples 46 (0.5%) and Example 47 (1.0%).

EXAMPLES 48 to 51

The following Examples 48 to 51 illustrate a steeping method for obtaining an intimate blend of formaldehyde compound and nitrile polymer. In these examples 100 parts of an acrylonitrile/styrene (70% acrylonitrile) copolymer in bead form is steeped in 100 parts of water which contains either formaldehyde or the paraformaldehyde used in Examples 1 to 5 above as the formaldehyde compound. In either case the amount used is given in percent by weight based on the weight of the polymer. The steeping is carried out for four (4) hours at 145° C. and then the beads are filtered, washed and dried. The dry beads are extruded into pellets and then molded into tensile bars using the procedures outlined above. The tensile bars are then subjected to HCN extraction tests using 3% acetic acid and an extraction time of 3 days at 49° C. The results of the extraction tests are reported in Table IX below.

TABLE IX

SUMMARY OF EXAMPLES 48 to 51

| Example | Formaldehyde Compound | % | Color[1] | Extraction HCN (PPB) |
|---|---|---|---|---|
| 48 | None | None | 109 | 85 |
| 49 | formaldehyde | 0.5 | 114 | <20 |
| 50 | formaldehyde | 0.1 | 123 | 25 |
| 51 | paraformaldehyde | 0.5 | 115 | <20 |

[1]Color is Three Point Yellowness (3 PY) by reflected light.

The above results indicate that steeping the formaldehyde compound into the polymer results in a reduction in the amount of extractable HCN The value of 25 PPB extractable HCN reported for Example 50 indicates that under the particular steeping conditions used amounts of formaldehyde in excess of 0.1% are required to reduce the extractable HCN level to less than 20 PPB.

One of the surprising aspects of the present invention is that extraction tests on tensile bars indicate that any HCN in the polymer which is in the form of formaldehyde cyanohydrin (H0 $CH_2CN$) (the reaction product of HCN and formaldehyde) is not being extracted in any significant amounts.

In Examples 52 to 54 cyanohydrin extraction tests are run on a series of tensile bars prepared from various acrylonitrile-styrene copolymers which contain 70% acrylonitrile. The formaldehyde compound used is the paraformaldehyde used in Examples 1 to 5 and the extraction time is 3 days at 49° C. Results of these tests which show the low level of cyanohydrin extracted are reported in Table X below.

TABLE X

SUMMARY OF CYANOHYDRIN EXTRACTION TESTS

| Example | % Paraformaldehyde | Amount of Cyanohydrin as HCN (PPB) |
|---|---|---|
| 52 | 0.1 | <20 |
| 53 | 0.3 | <20 |
| 54 | 0.5 | <20 |

TASTE TESTS

Taste tests are conducted using 10 ounce bottles which were formed as outlined above from various acrylonitrile/styrene copolymers containing 70% acrylonitrile. The nitrile polymers are blended with various amounts of paraformaldehyde, para-toluene sulfonamide-formaldehyde condensate or sodium formaldehyde bisulfite. The blends are extruded into pellets and formed into 10 bottles of the type conventionally used for soft drinks using the procedure outlined in Examples 1 to 4 above. The bottles are filled with 10 ounces of a well-known commercially available cola beverage (Coca-Cola[200]) and placed in an oven for seven days at 30° C. (100° F.) along with the same beverage in a glass bottle. At the end of this period, the contents of the plastic bottles are poured into each of 10 unmarked vessels and the contents of the glass bottle is poured into each of 20 unmarked vessels. Five persons previously trained in taste-test techniques and sensitive to detecting taste due to extracted HCN are chosen to act as a taste panel. Each member of the panel is given two of the vessels containing the cola beverage from the glass bottle and one vessle containing the cola beverage from the plastic bottle. The tasters do not know which one of the three vessels contain the beverage from the plastic bottle and are asked to determine whether one of the three samples has a taste different from that of the other two, and, if so, to designate which one. This is known as a "Triangle Taste Test." The test is then repeated to determine reproducibility. If a panel detects a taste difference due to HCN in the beverage packaged in a plastic bottle, the plastic bottle is deemed to "fail" the taste test.

Also, HCN extraction data is obtained on the blown bottles using 3% acetic acid as the extracting liquid and an extraction time of 7 days at 38° C. The results of these tests are summarized in Table XI below.

TABLE XI

SUMMARY OF TASTE AND EXTRACTABLE HCN TESTS ON 10 OUNCE BOTTLES

| Ex. | Formaldehyde Compound | Amount Used[1] | HCN (PPB) Extracted | HCN Taste Test |
|---|---|---|---|---|
| 55 | None | Control | 70 | Fail |
| 56 | paraformaldehyde | 0.05 | <20 | Pass |
| 57 | " | 0.075 | <20 | Pass |
| 58 | None | Control | 57 | Fail |
| 59 | paraformaldehyde | 0.1 | <20 | Pass |
| 60 | " | 0.25 | <20 | Pass |
| 61 | " | 0.25 (Plus 0.1% citric acid | <20 | Pass |
| 62 | " | 0.5 | <20 | Pass |
| 63 | " | 0.5 | <20 | Pass |
| 64 | None | Control | 50 | Fail |
| 65 | sodium formaldehyde bisulfite | 0.05 | <20 | Pass |
| 66 | sodium formaldehyde bisulfite | 0.10 | <20 | Pass |
| 67 | None | Control | 94 | Fail |
| 68 | para-toluene sulfonamide-formaldehyde condensate | 2 | <20 | Pass |

[1]Percent by weight based on the nitrile resin.

The data in Table XI clearly show the improvements in HCN taste properties that is obtained when the extractable HCN content of the packaging material is reduced to less than 20 PPB using a formaldehyde compound such as paraformaldehyde, para-toluene sulfonamide-formaldehyde condensate or sodium formaldehyde bisulfite, in accordance with the teachings of the present invention. The polymer used in Example 63 was extruded five 5 times prior to blowing bottle in order to simulate bottle recycling conditions. The improved taste properties are retained even after the simulated recycling.

The present invention also contemplates the use of other additives and ingredients in the polymeric composition which do not adversely effect the taste properties of the resulting packaging materials. Examples of these ingredients include thermal stabilizers, light stabilizers, dyes, pigments, plasticizers, fillers, antioxidants, lubricants, extrusion aids, etc.

It is obvious that many variations may be made in the products and processes set forth above without departing from the spirit and scope of this invention.

What is claimed is:

1. A process for preparing an extruded, pelleted molding composition for use in food, beverages and other related packaging applications which process comprises:
   A. Dry blending a nitrile polymer, having an extractable HCN content greater than 20 PPB, in an essentially solvent free condition with a formaldehyde compound containing from 0.0005 to 2% by weight of available formaldehyde based on the weight of the nitrile polymer, wherein the nitrile polymer is a polymer of acrylonitrile and at least one comonomer selected from the group consisting of styrene, alpha-methyl styrene, methacrylonitrile, lower alpha olefins containing 2 to 6 carbon atoms, alkyl esters of acrylic and methacrylic acid wherein the alkyl group contains from 1 to 4 carbon atoms, vinyl acetate and alkyl vinyl ethers wherein the alkyl group contains from 1 to 4 carbon atoms, and mixtures thereof; wherein the polymer contains from 60 to 85% by weight of acrylonitrile and from 0 to 16% by weight of methacrylonitrile, based on the total polymer weight;
   B. Heating and extruding the resulting blend in a molten state and then
   C. Pelletizing the extruded polymer.

2. A process as in claim 1 wherein the nitrile polymer further contains from 0 to 25% by weight of a synthetic or natural rubber component.

3. A process as in claim 1 wherein the formaldehyde compound is selected from the group consisting of formaldehyde, homopolymers of formaldehyde, hexamethylenetetramine, dimethylol urea, condensates of para-toluene sulfonamide and formaldehyde, alkali metal formaldehyde bisulfites, alkali metal formaldehyde sulfoxylates and addition products of formaldehyde and another compound.

4. A process as in claim 1 wherein the comonomer is styrene.

5. A process for preparing an extruded, pelleted molding composition for use in food, beverages and other related packaging applications which process comprises:
   A. Dry blending a nitrile polymer, having an extractable HCN content greater than 20 PPB, in an essentially solvent free condition with a formaldehyde compound containing from 0.005 to 2% by weight of available formaldehyde based on the weight of the nitrile polymer wherein the nitrile polymer is a polymer of acrylonitrile and styrene, and wherein the formaldehyde compound is selected from the group consisting of formaldehyde, homopolymers of formaldehyde, dimethylol urea, condensates of paratoluene sulfonamide and formaldehyde, and addition products of formaldehyde and another compound,
   B. Heating and extruding the resulting blend in a molten state and then
   C. Pelletizing the extruded polymer.

* * * * *